ABSTRACT OF THE DISCLOSURE

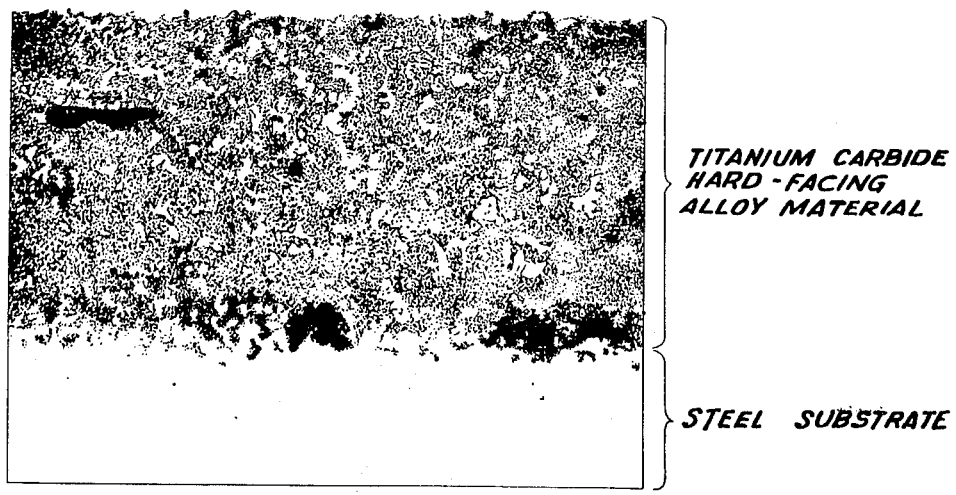
TITANIUM CARBIDE
HARD-FACING
ALLOY MATERIAL
STEEL SUBSTRATE 3,725,016
TITANIUM CARBIDE HARD-FACING
STEEL-BASE COMPOSITION
M. Kumar Mal, Nanuet, and Stuart E. Tarkan, Monsey,
N.Y., assignors to Chromalloy American Corporation
Filed Jan. 24, 1972, Ser. No. 220,074
Int. Cl. B22f 1/00
U.S. Cl. 29—182.3                                    7 Claims

A titanium carbide hard-facing steel-base composition is provided consisting essentially by weight of about 10% to 75% titanium carbide, and steel-forming matrix ingredients making up essentially the balance, the matrix being formed of up to about 20% chromium, about 1% to 5% boron, about 2% to 8% silicon, about 1.5% to 5% carbon, up to about 5% molybdenum, and the balance essentially iron.

---

This invention relates to a titanium carbide hard-facing steel-base composition and to a hard-facing coating metallurgically bonded to a metal substrate.

STATE OF THE ART

It is known to hard face metal substrates by using welding and brazing methods in which the metal substrate is simultaneously heated during the laying down of the hard-facing material to assure a metallurgical bond between the resulting hard coating and the metal substrate, such as a steel substrate.

Another method is to employ flame spraying. This method comprises melting powder metal compositions in a heated zone and propelling the molten particles to the surface of a metal substrate to form a coating thereon.

A hard-facing composition should have good fluidity when melted and be capable of wetting the metal substrate. Besides having optimum wear resistance, the coating produced on the metal substrate should exhibit good corrosion resistance, very low coefficient of friction in wear applications and have a matrix capable of being hardened by heat treatment.

We have developed a composition which not only meets the foregoing requirements but also provides certain economic advantages. By employing titanium carbide as the hard material, we find that we can provide a low density coating compared to tungsten carbide which has a very high density, whereby we can effectively cover more surface with the same unit weight of composition.

OBJECTS OF THE INVENTION

It is thus the object of the invention to provide a titanium carbide hard-facing steel-base composition capable of being easily metallurgically bonded to a metal substrate.

Another object is to provide a hard-facing titanium carbide coating metallurgically bonded to a metal substrate.

These and other objects will more clearly appear when taken in conjunction with the following disclosure and the appended claims, reference being made to the figure which depicts a representation of a photomicrograph taken at 100 times magnification showing a titanium carbide hard facing composition metallurgically bonded to a steel substrate.

STATEMENT OF THE INVENTION

In its broad aspects, the invention provides a titanium carbide hard-facing steel-base composition consisting essentially by weight of about 10% to 75% titanium carbide with a steel-forming matrix making up essentially the balance (about 25% to 90%), the composition of the matrix being formed of up to about 20% chromium, preferably about 5% to 20%; about 1% to 5% boron, preferably about 2% to 4.5%; about 2% to 8% silicon, preferably about 3% to 6% silicon; about 1.5% to 5% carbon, preferably about 2% to 4%; 0 to about 5% molybdenum, preferably about 0.5% to 5% and the balance essentially iron.

A preferred composition is one containing about 50% by weight of titanium carbide with the steel-base matrix making up essentially the balance.

In order to achieve the desired properties, titanium carbide is particularly suited as the hard phase, especially rounded particles or grains of titanium carbide. Since titanium carbide is one of the hardest of the refractory carbides, it tends, therefore, to provide optimum wear resistance. By judiciously controlling the matrix composition to provide a relatively low melting point in the neighborhood of about 1190° C. to 1200° C., improved wettability is assured, as well as improved bondability of the coating.

DETAILS OF THE INVENTION

As illustrative of one embodiment of the invention, the following example is given:

Example 1

A hard-facing powder composition was produced by blending 2000 grams of titanium carbide powder (about 5 to 7 microns in size) with 2000 grams of the following matrix-forming ingredients:

|            | Grs.  | Percent wt. |
|------------|-------|-------------|
| Chromium   | 290   | 14.5        |
| Boron      | 70    | 3.5         |
| Silicon    | 90    | 4.5         |
| Carbon     | 60    | 3.0         |
| Molybdenum | 30    | 1.5         |
| Iron       | 1,460 | 73.0        |
| Total      |       | 100.0       |

The mixture is placed in a mill half filled with stainless steel balls. The milling is conducted for about 40 hours using hexane as a vehicle. The average particle size of the milled product after drying falls within the range of about 2 to 6 microns.

The dried powder mixture is then formed into a slurry by mixing 150 grams of the powder mix with 100 milliliters of a liquid organic material which acts both as a vehicle and binder when mixed with the hard-facing powder. The binder volatilizes completely at a temperature below 700° F. without leaving a residue. Examples of organic binders are glycerol, fatty acids (e.g. stearic acid), polyoxyethylene glycol, ethylene glycol, methyl methacrylate solutions, and the like. A coating is produced on a metal substrate by spraying, dipping or painting the substrate with a layer of the slurry followed by drying.

In this example, the substrate is a steel plate of S–1 shock resistant tool steel (about 0.5% C, 1.5% Cr, 2.5% W, and the balance iron) which is prepared for receiving the coating by degreasing the surface thereof followed by shot blasting with chilled iron grit. The purpose of the shot blasting is to roughen the surface to facilitate the formation of an initial mechanical bond between the deposited coating and the steel plate. After spraying on the slurry of coating material, the coating is dried. The assembly is then subjected to heating under substantially non-oxidiing conditions, e.g. in a vacuum or in an atmosphere of nitrogen, ammonia or other inert gas, at a temperature which fuses the coating, for example, in the neighborhood of 1190° C. to 1200° C., and produces a strong metallurgical bond between the fused coating and steel substrate. The same effect can be produced by heating with an oxyacetylene torch, care being taken to assure a slightly reducing flame to avoid oxidation as much as possible.

By allowing the fused coating to cool rapidly, the matrix can be hardened by virtue of the formation of a single or a combination of several hard phases formed as a decomposition product of austenite, for example, at least one decomposition product selected from the group consisting of bainite, martensite and cementite.

It in desirable that the steel matrix surrounding the titanium carbide grains be hardened to avoid selective wearing away of the matrix, otherwise the hard grains of titanium carbide may loosen and fall out in applications involving sliding friction. By having a high chromium content in the matrix, corrosion resistance is imparted to the hard coating as well.

As illustrative of a typical coating produced by the invention, reference is made to the accompanying drawing which shows the metallurgical bond produced at the interface between the fused coating and the steel substrate. The coating is hardened by the formation of a hard phase, such as martensite, obtained by rapidly cooling the fused coating from a temperature above 1750° F. (955° C.). The Vickers microhardness (50 gr. load) of the area coated may vary from 2060 to 2950 VHN, depending upon the density of the titanium carbide particles and the presence of different phases in the matrix of the coating.

Example 2

As illustrative of another embodiment, the following composition is given consisting essentially of about 35% by weight of titanium carbide (700 grs.) mixed with 1300 grams of steel-forming ingredients as follows:

|  | Grs. | Percent by wt. |
|---|---|---|
| Chromium | 65.0 | 5.0 |
| Boron | 26.0 | 2.0 |
| Silicon | 39.0 | 3.0 |
| Carbon | 26.0 | 2.0 |
| Molybdenum | 26.0 | 2.0 |
| Iron | 1,118.0 | 86.0 |
| Total | 1,300.0 | 100.0 |

This composition is produced in the same manner as in Example 1 and similarly applied to a metal substrate.

Further examples of titanium carbide hard-facing compositions are given as follows:

Example 3

About 15% by weight of titanium carbide (450 grs.) is mixed with about 85% by weight (2550 grs.) of a steel-forming matrix having the following composition:

|  | Grs. | Percent by wt. |
|---|---|---|
| Chromium | 510.0 | 20.0 |
| Boron | 115.0 | 4.5 |
| Silicon | 51.0 | 2.0 |
| Carbon | 102.0 | 4.0 |
| Iron | 1,772.0 | 69.5 |
| Total | 2,550.0 | 100.0 |

Example 4

A hard-facing composition is produced as in Examples 1 to 3 by mixing 65% by weight of titanium carbide (1950 grs.) with about 35% by weight of steel-forming ingredients (1050 grs.) having the following composition:

|  | Grs. | Percent by wt. |
|---|---|---|
| Chromium | 31.5 | 3.0 |
| Boron | 10.5 | 1.0 |
| Silicon | 63.0 | 6.0 |
| Carbon | 15.75 | 1.5 |
| Molybdenum | 15.75 | 1.5 |
| Iron | 913.50 | 87.0 |
| Total | 1,050.00 | 100.0 |

To optimize the quality of the hard-facing composition, it is preferred to use as a main ingredient a powder produced from a sintered composition of a titanium carbide tool steel into which is thereafter blended the necessary modifying ingredients to produce the desired matrix composition. The sintered composition may have the following composition: about 10% to 75% by weight of titanium carbide and the balance essentially a steel matrix, the matrix containing by weight about 1% to 10% chromium, 0 to about 5% molybdenum (e.g., 1% to 5%), about 0.4% to 1.5% carbon and the balance essentially iron. By using the foregoing sintered composition as a base, sufficient of the modifying elements are added to produce the desired low melting matrix.

The advantage of using the sintered composition is that rounded titanium carbide grains are produced by liquid phase sintering. Rounded carbide grains in the hard facing coating assure low friction in applications involving wear by sliding friction.

A sintered titanium carbide tool steel starting composition containing about 50% by weight of TiC and substantially the balance a steel matrix, such as a chromium-molybdenum steel composition, is produced by mixing 2000 grams TiC (of about 5 to 7 microns in size) with 2000 grams of steel-forming ingredients in a mill half filled with stainless steel balls. To the powder mix is added 1 gram of paraffin wax for 100 grams of mix. The milling is conducted for about 40 hours using hexane as a vehicle. A specific steel-forming composition for the matrix is one containing of 0.5% C, about 3% Cr, about 3% Mo and the remainder substantially iron. It is preferred to use carbonyl iron powder in producing the mixture. A carbidic tool steel of the foregoing type is disclosed in U.S. Pat. No. 3,416,976.

Following completion of the milling, the mix is removed and dried and compacts of the desired shape pressed at about 15 t.s.i. and the compacts then subjected to liquid phase sintering in vacuum at a temperature of about 2640° F. (1450° C.) for about one-half hour at a vacuum corresponding to 20 microns or less. After completion of the sintering, the compacts are cooled and then removed from the furnace. The primary titanium carbide grains, which are angular before sintering, assume a rounded configuration as a result of liquid phase sintering. By "liquid phase sintering" is meant heating the compact to above the melting point of the steel matrix but below the melting point for titanium carbide, for example, up to about 180° F. (100° C.) above the melting point of the steel matrix.

Following the production of the sintered compact, the sintered compact may be converted into chips by machining and the chips milled in a ball mill to a size ranging from about 2 to 5 microns. The powder is cleaned and dried for blending with modifying ingredients. As stated above, rounded titanium carbide grains are preferred in the ultimate coating since this configuration imparts low friction characteristics to the coating in wear application.

Example 5

The sintered powder composition disclosed hereinabove is formulated into a hard-facing coating material by the addition of predetermined amounts of boron and silicon and, if necessary, optional amounts of any one or more of titanium carbide, chromium, carbon, molybdenum, etc.

The starting presintered powder material may have the following composition: 50% by weight of rounded grains of titanium carbide dispersed through a steel matrix making up the balance of about 50%.

The steel matrix contains by weight: 3% chromium; 3% molybdenum; 0.5% carbon; balance iron.

The foregoing presintered material is referred to as A powder. The hard-facing composition is formulated as follows:

(1) ......... 3,000 grs. A powder ......... $\begin{cases} 1,500 \text{ grs. TiC.} \\ 45 \text{ grs. Cr} \\ 45 \text{ grs. Mo} \\ 7.5 \text{ grs. C} \\ 1,402.5 \text{ grs. Fe} \end{cases}$ Matr'x.

As will be noted, the matrix makes up about 1500 grs. of the presintered composition.

The modifying ingredients added to the matrix are as follows:

(2) ..... 350 grams ... $\begin{cases} 175 \text{ grs. Cr.} \\ 35 \text{ grs. C.} \\ 60 \text{ grs. Si.} \\ 80 \text{ grs. B.} \end{cases}$ Combining formulations (1) and (2), a total average composition is obtained containing 1500 grams TiC (45%) and 1850 grams of matrix (55%). The average composition of the matrix is as follows:

|   | Elements | Weight elements | Percent elements |
|---|---|---|---|
| (3) | Cr | 220.0 | 12.0 |
|   | Mo | 45.0 | 2.4 |
|   | C | 42.5 | 2.3 |
|   | Si | 60.0 | 3.3 |
|   | B | 80.0 | 4.3 |
|   | Fe | 1,402.5 | 75.7 |
| Total |   | 1,850.0 | 100.0 |

Following blending of the presintered composition (1) and modifying ingredients (2), the mixture is placed in a ball mill and ground to an average particle size ranging from about 2 to 6 microns. As stated hereinabove, the advantages of the foregoing composition are that the carbide grains are rounded and provide low friction in applications involving resistance to wear, e.g. sliding friction.

Stating it broadly, the invention thus provides a titanium carbide hard-facing steel-base powder consisting essentially of a powder-sintered composition blended with modifying elements to produce the desired final composition. The sintered powder composition used in the blend contains by weight about 10% to 75% titanium carbide dispersed as rounded grains through a steel matrix making up essentially the balance, the matrix containing about 1% to 10% chromium, 0 to 5% molybdenum, about 0.4 to 1.5% carbon and the balance essentially iron. The foregoing powder has blended with it the ingredients silicon and boron and optionally any one or more of the additional ingredients carbon, chromium, titanium carbide, and molybdenum to provide an average hard-facing composition consisting essentially of about 10% to 75% titanium carbide and the balance essentially a steel-base composition containing about 0% to 20% chromium, about 1% to 5% boron, about 2% to 8% silicon, about 1.5% to 5% carbon, 0 to 5% molybdenum and the balance essentially iron.

A hard-facing coating produced from the foregoing composition rapidly cooled is usually characterized by a microstructure comprising rounded grains of titanium carbide dispersed through a steel matrix containing as a decomposition product one or more of bainite or martensite.

Illustrative applications in which the hard-facing coating material can be employed are: earth-cutting tools, chutes, agricultural implements and snowplow blades. A formulation with high chromium and carbon provides excellent corrosion and abrasion resistance and improved high temperature strength desired for hot wear applications. The low coefficient of friction of the hard-facing material provides good metal-to-metal wear protection and makes the material extremely suitable for bushings, knives, cams and shear blades.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A titanium carbide hard-facing steel-base composition consisting essentially by weight of about 10% to 75% titanium carbide and steel-forming matrix ingredients making up essentially the balance, said matrix being formed of up to about 20% chromium, about 1% to 5% boron, about 2% to 8% silicon, about 1.5% to 5% carbon, 0 to about 5% molybdenum and the balance essentially iron.

2. The hard-facing composition of claim 1, wherein the chromium content of the matrix ranges from about 5% to 20%, the boron content from about 2% to 4.5%, the silicon content from about 3% to 6%, the carbon content from about 2% to 4% and the molybdenum content from about 0.5 to 5%.

3. A titanium carbide hard-facing steel-base powder composition consisting essentially of a powdered sintered composition containing by weight about 10% to 75% titanium carbide dispersed as rounded grains through a matrix containing about 1% ot 10% chromium, about 0 to 5% molybdenum, about 0.4% to 1.5% carbon and the balance essentially iron, said sintered powder having blended therewith additional matrix-forming ingredients including at least boron and silicon and any one or more of chromium, carbon, titanium carbide and molybdenum necessary to provide an average composition after hard-facing consisting essentially by weight of about 10% to 75% titanium carbide and the balance essentially a steel-base matrix containing up to about 20% chromium, about 1% to 5% boron, about 2% to 8% silicon, about 1.5% to 5% carbon, 0 to 5% molybdenum and the balance essentially iron.

4. The hard-facing composition of claim 3, wherein the average composition of the matrix ranges from about 5% to 20% chromium, about 2% to 4.5% boron, about 3% to 6% silicon, about 2% to 4% carbon, and about 1% to 5% molybdenum.

5. A titanium carbide hard-facing steel-base coating metallurgically bonded to a metal substrate, said coating consisting essentially of grains of titanium carbide in an amount ranging by weight from about 10% to 75% dispersed through a steel matrix containing up to about 20% chromium, about 1% to 5% boron, about 2% to 8% silicon, about 1.5% to 5% carbon, 0 to about 5% molybdenum and the balance essentially iron.

6. The coating of claim 5, wherein the matrix contains about 5% to 20% chromium, about 2.5 to 4.5% boron, about 3% to 6% silicon, about 2% to 4% carbon and about 0.5% to 5% molybdenum.

7. The coating of claim 5, wherein the titanium carbide grains are rounded.

References Cited
UNITED STATES PATENTS

| 3,653,982 | 4/1972 | Prill | 148—126 X |
| 3,109,917 | 11/1963 | Schmidt et al. | 29—182.7 X |
| 3,129,095 | 4/1964 | Luce et al. | 75—126 A |
| 2,268,428 | 12/1941 | Schlumpf | 75—126 A |

CARL D. QUARFORTH, Primary Examiner

R. E. SCHAFER, Assistant Examiner

U.S. Cl. X.R.

29—182.8; 75—0.5